United States Patent [19]

Draxler

[11] 4,102,473

[45] Jul. 25, 1978

[54] QUICK COUPLING/LOCKING DEVICE

[75] Inventor: Walter E. Draxler, Arlington Heights, Ill.

[73] Assignee: Arrow Pneumatic, Inc., Forest Park, Ill.

[21] Appl. No.: 839,337

[22] Filed: Oct. 5, 1977

[51] Int. Cl.² .................................. B65D 45/32
[52] U.S. Cl. .................................. 220/319; 220/295
[58] Field of Search ............... 220/293, 295, 298, 301, 220/319; 210/234; 55/219

[56] References Cited

U.S. PATENT DOCUMENTS 3,214,054  10/1965  Poethig ........................... 220/319 X
3,507,098  4/1970   Veres et al. ...................... 220/293 X
3,746,171  7/1973   Thomsen ........................... 210/234

Primary Examiner—George T. Hall
Attorney, Agent, or Firm—Allegretti, Newitt, Witcoff & McAndrews

[57] ABSTRACT

An improved interlocking assembly for an air filter, air lubricator, filter-regulator piggyback or the like which includes a pressure vessel normally retained by a head member and an interlocking collar. The pressure vessel nests in the collar to prevent accidental separation of the head member and pressure vessel. Locking tabs on the collar from being removed unless it is sequentially raised, rotated and lowered.

5 Claims, 8 Drawing Figures

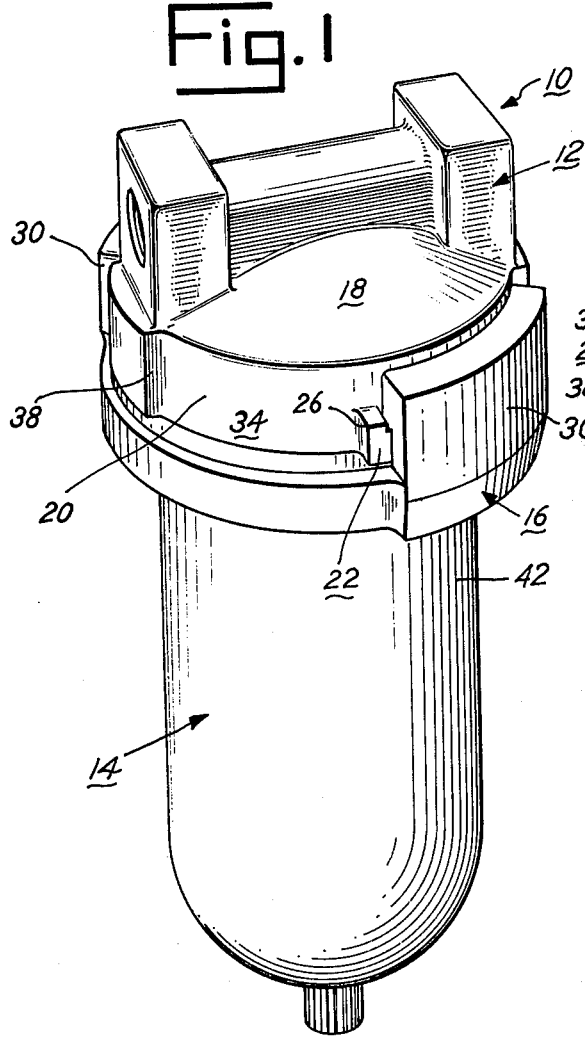
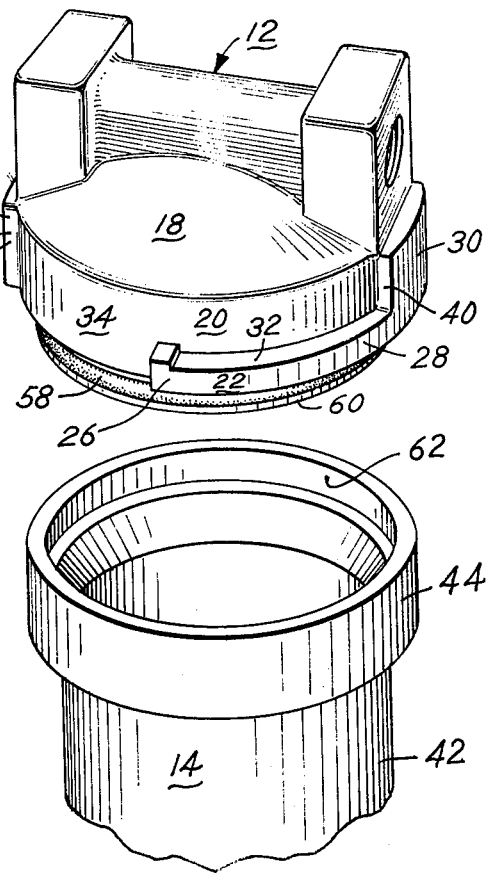
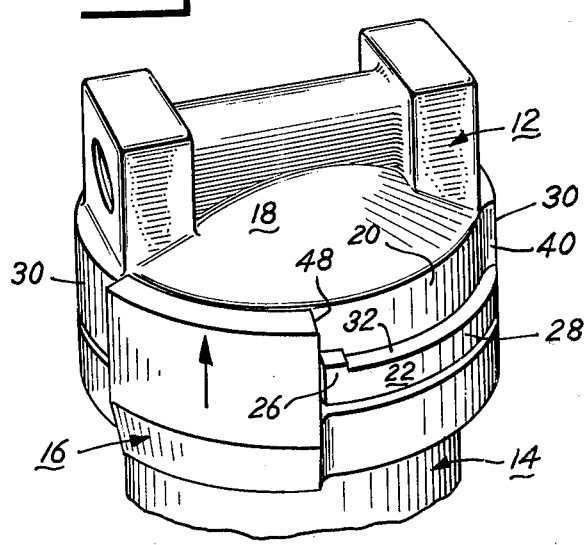
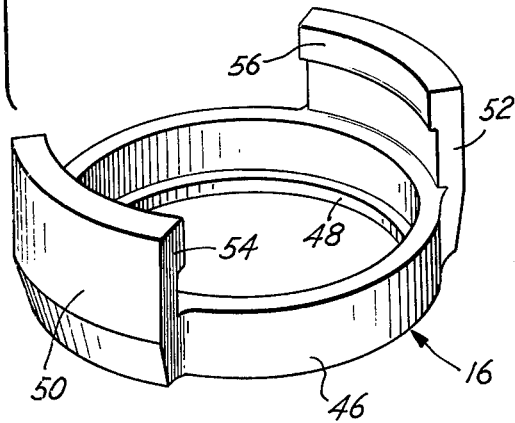

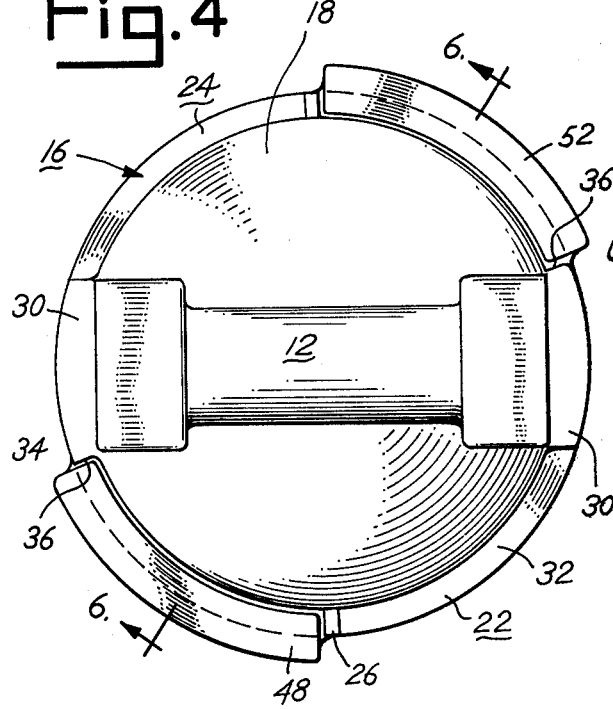
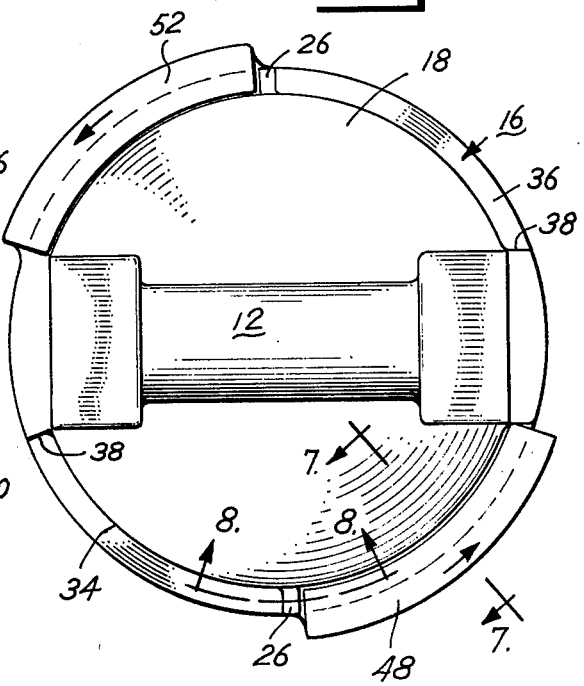
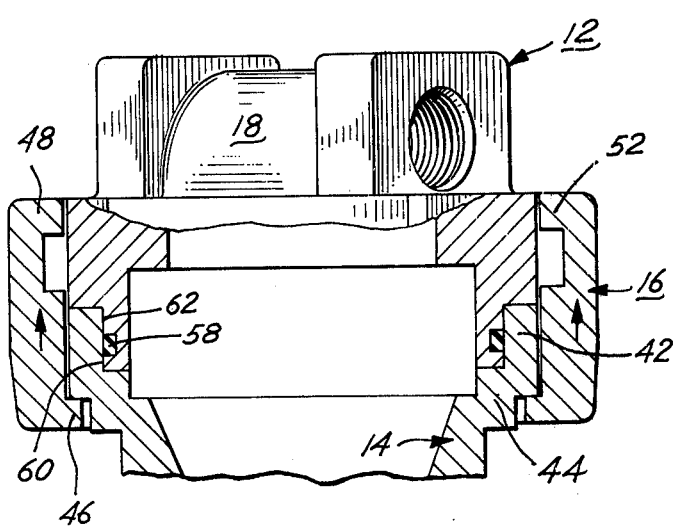
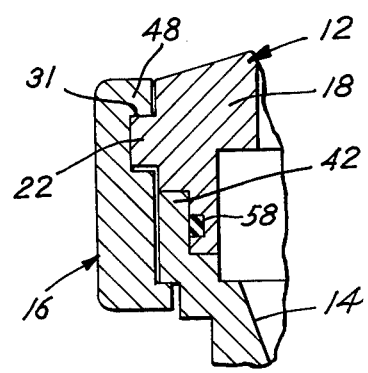
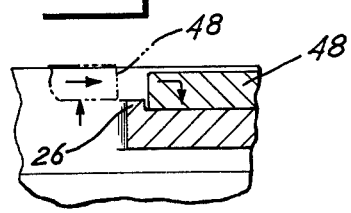

QUICK COUPLING/LOCKING DEVICE

BACKGROUND OF THE INVENTION

The present invention relates to an assembly for a device for conditioning a stream of compressed air, such as an air filter, air lubricator, filter-regulator piggyback or the like, and more particularly, to an improved interlocking assembly for such a device.

In the past, conventional, industrial-quality air filter, air lubricator, and filter-regulator piggyback devices have comprised a head member, a bowl or pressure vessel and an interlocking assembly which has included an interlocking collar or locking ring used to secure the bowl or pressure vessel to the head member. The collar has had both a lip in which a shoulder on the pressure vessel is normally nested, and internal threads which are designed to be mated with external threads on the head member. An O-ring is positioned between adjacent surfaces on the shoulder and the head member in a plane transverse to the axis of the threads to seal the bowl to the head member. Another filter or lubricator device which includes those components and features is disclosed in U.S. Pat. No. 3,746,171 entitled: Filter Assembly and issued on July 17, 1973, in the name of Jack Thomsen.

While such prior interlocking assemblies have been useful, an assembly that included a threaded head member and a threaded collar was difficult to disassemble. One reason was that the head member and collar were preferably aluminum, which resulted in relatively rough threads. Another was that the O-ring, which had to be highly compressed, caused increased friction between the threads. As for the assembly disclosed in the Thomsen patent, that assembly is somewhat complex and includes a clamping collar through which the pressure vessel could be dropped, if the clamping collar and pressure vessel were not kept in registry with each other.

SUMMARY OF THE INVENTION

A principal object of the present invention is the provision of a new and improved interlocking assembly for a device such as an air filter, air lubricator, filter-regulator piggyback or the like.

Another object of the present invention is the provision of a new and improved interlocking assembly including a head member, a pressure vessel and a collar which may be quickly and readily assembled and disassembled. A related object of the present invention is the provision of a new and improved interlocking assembly including a head member, a pressure vessel and a collar in which the pressure vessel nests in the collar.

Still another object of the present invention is the provision of a quickly assembled disassembled interlocking assembly in which the head member has locking tabs for preventing the collar and nested pressure vessel from being accidentally unlocked from the head member.

A further object of the present invention is the provision of an improved interlocking assembly in which the head member has circumferentially spaced ledge formations and the collar has circumferentially spaced lugs, the head member and collar cooperating so that the lugs may be raised past the ledge formations, rotated, about its longitudinal axis, to a position above the ledge formations and lowered into contact therewith. A related object of the present invention is the provision of an improved interlocking assembly in which the ledge formations guide the movement and rotation of the lugs and prevent undesired rotation thereof out of registry with the ledge formations.

A still further object of the present invention is the provision of an improved interlocking assembly in which an O-ring seals the pressure vessel and the head member together along two surfaces thereon which are perpendicular to the plane of rotation of the collar.

Still another object of the present invention is the provision of an assembly which requires a minimum amount of machining and can be relatively readily and economically manufactured.

Therefore, in a principal aspect, the present invention provides an improved interlocking assembly for a device such as an air filter, air lubricator, filter-regulator piggyback or the like, wherein a pressure vessel is pressed and locked against a head member by a collar that interlocks the head member and pressure vessel. The head member includes a plurality of ledge formations, each having a locking tab and an adjacent recessed support surface. The pressure vessel includes an open end portion having a shoulder, and the collar includes a ring portion, a lip and a plurality of spaced lugs. The pressure vessel and collar cooperate so that the open end portion of the pressure vessel may nest in the ring portion of the collar with the shoulder of the pressure vessel abutting the lip of the collar. The pressure vessel thus cannot be dropped from the collar.

The head member and collar also cooperate, so that the lugs of the collar may be raised past the ledge formations, rotated to a position above the support surfaces and lowered to a normal or assembled state.

In the assembled state, the locking tabs prevent the collar from being removed unless it is sequentially raised, rotated and lowered. The pressure vessel is thus held against the head member by the collar and both the pressure vessel and the collar are kept from being accidentally removed, while remaining easily removable.

BRIEF DESCRIPTION OF THE DRAWINGS

The preferred embodiment of the invention will be described in connection with the drawing wherein:

FIG. 1 is a perspective view of a preferred embodiment of the present invention in an assembled state;

FIG. 2 is an exploded view of the preferred embodiment of FIG. 1;

FIG. 3 is a partial perspective view of the preferred embodiment wherein the collar has been rotated 90° clockwise from the position depicted in FIG. 1;

FIG. 4 is a top plan view of the preferred embodiment as depicted in FIG. 3;

FIG. 5 is a top plan view of the preferred embodiment as depicted in FIG. 1;

FIG. 6 is a partial section view of the preferred embodiment taken along line 6—6 of FIG. 4;

FIG. 7 is a partial section view of the preferred embodiment taken along line 7—7 in FIG. 5; and FIG. 8 is a partial section view of the preferred embodiment taken along line 8—8 in FIG. 5.

DESCRIPTION OF THE PREFERRED EMBODIMENT

The embodiment of the improved interlocking assembly of the present invention shown in FIGS. 1-8 is designed to be used with an air filter, air lubricator, filter-regulator piggyback, or the like which is generally indicated at 10 and which includes a fixedly mounted head member 12, and a bowl or pressure vessel 14 normally retained against the head member 12. A collar 16 is used to normally secure the pressure vessel 14 to the head member 12 as described hereinafter. The pressure vessel 14 nests within and is supported by the collar 16. Locking tabs 26 on the head 12 prevent the collar 16 and the pressure vessel 14 from being removed from the head 12 unless the collar 16 is sequentially raised, rotated and lowered, as will be described in more detail below.

As shown in the exploded view of FIG. 2, the head member 12 includes a closed, generally annular end portion 18 having a longitudinally extending, generally cylindrical outer wall 20 of preselected diameter and length or height. Two diametrically opposed, radially outwardly projecting ledge formations 22 and 24 are integrally formed on the outer wall 20.

Each of the ledge formations 22 and 24 includes a locking tab or stop member 26, an adjacent support ledge section 28 and a wall section 30. The wall section 30 has a longitudinal length or height equal to that of the cylindrical outer wall 20. The locking tab 26 has a height approximately half that of the wall section 30, i.e. that of the cylindrical outer wall 20, and the support ledge section 28 has a height less than that of the locking tab 26. The locking tab 26 thus defines a transverse support surface 23 which is recessed from the upper ends of both the locking tab 26 and the wall section 30. The ledge formations 22 and 24, i.e. the locking tab 26, the support ledge section 28 and the wall section 30, have a uniform preselected radial width.

Defined on the outer wall 20 between the diametrically opposed ledge formations 22 and 24 are diametrically opposed slots 34 and 36. The arcuate length of each slot 34 and 36 substantially equals that of the support ledge sections 28. The edge of the wall sections 30 adjacent to the slots 34 and 36 defines a first longitudinally extending and radially projecting guiding surface 38. A second longitudinally extending and radially projecting guiding surface 40 is also defined by the other edge of wall section 30 i.e. the edge facing the adjacent support ledge section 28.

Referring now to FIGS. 1, 2, and 6, the pressure vessel 14 includes a cylindrical open end portion 42 and an enlarged circumferential shoulder or support flange 44. The open end portion 42 has a preselected inner diameter, dependent on the capacity desired for the pressure vessel, and a preselected wall thickness, dependent on the material that the pressure vessel 14 is to be made of and the pressure to be withstood. The outer diameter of the shoulder 44 is substantially equal to the diameter of the outer wall 20.

The collar 16 includes an annular ring section 46, an annular lip 48 and two diametrically opposed, radially projecting and upwardly, axially extending arcuate lug members 50 and 52. The lip 48 extends radially inwardly from the lower edge of the ring section 46. The lug members 50 and 52 terminate in radially inwardly projecting ends 54 and 56.

The collar 16 is adapted so that the pressure vessel 14 normally nests therein. In other words, the ring section 46 has an inner diameter substantially equal to the outer diameter of the shoulder 44, and the lip 48 has an inner diameter less than the outer diameter of the shoulder 44 but greater than the outer diameter of the open end portion 42 of the pressure vessel 14. With this configuration, the collar 16 normally fits over the closed lower end of the pressure vessel 14 and the shoulder 44 abuts the lip 48.

The collar 16 is also adapted to cooperate with the ledge formations 22 and 24 and slots 34 and 36 of the head member 12. The diametric distance separating the inwardly projecting ends 54 and 56 of the lug members 50 and 52 is substantially equal to the diameter of the outer wall 20. The inwardly facing surface of each end 54 and 56 is arcuate and has a radius of curvature substantially matching that of the outer wall 20.

The height, the arcuate length, and the distance between the inwardly facing surfaces of the ends 54 and 56 are chosen so that the collar 16 normally fits over the outer wall 20 of the head member 12, as shown in FIG. 1. Each lug member 50 and 52 has a height, as measured between the ring section 46, and the ends 54 and 56, selected so that the lower surface of the ends 54 and 56 are slightly above and out of interference with the locking tab 28 when the collar 16 is raised to the position shown in FIG. 3, i.e. raised to the position wherein the upper surface of the ring section 46 is in contact with the lower surface of the ledge formations 22 and 24. In arcuate length, each end 54 and 56 has a length substantially equal to, but less than, the arcuate length of the slots 34 and 36. Finally, in distance between inner surfaces, the lug members 50 and 52 are separated by a distance such that they do not interfere with the ledge formations 22 and 24 and during rotation of the collar 16 about its longitudinal axis.

The collar 16, the pressure vessel 14 and the head member 12 are thus readily coupled. First, the pressure vessel 14 is nested in the collar 16, as described. The collar 16 is then positioned with the ends 54 and 56 in registry or aligned with the slots 34 and 36 and is raised to the position shown in FIG. 3 wherein the upper surface of the ring section 46 abuts the lower surface of the ledge formations 22 and 24. The first guiding surface 38 guides the relative upward movement of the collar. Once the ends 54 and 56 are above the upper surface of the locking tabs 26, the collar 16 is rotated, about its longitudinal axis, so that the ends are moved toward the second guiding surfaces 40. Such rotation is stopped when the ends 54 and 56 come into contact with the second guiding surfaces 40. The position of the collar 16 before this rotation is that shown in FIG. 4, and the position of the collar 16 after rotation is that shown in FIG. 5. After rotation, the collar 16 is lowered so that the lower surfaces of the ends 54 and 56 rest on and against the support surfaces 32 of the support ledge sections 28. The device 10 is thus assembled as shown in FIG. 1. Once assembled, the device 10 can be put into service.

As shown in FIGS. 2, 6 and 7, an O-ring 58 is fitted into a groove defined on an annular, longitudinally extending cylindrical wall portion 60 which depends from and is coaxial with the lower end of the wall 20 of the member 12 and which has a radial outer dimension that is less than that of the wall 20. The O-ring 58 is compressed slightly by the vertical, radially inwardly facing wall 62 of the flange 44 when the pressure vessel 14 is assembled to the head member 12. Thus the O-ring 58 seals the pressure vessel 14 to the head member 12. Because of the positioning of the O-ring 58 between the wall portion 60 and the wall 62, whose facing annular surfaces are parallel and coaxial, the pressure vessel 14 need not be tightly held against the head member 12.

In the assembled or coupled state, the pressure vessel 14 cannot drop through the collar 16 since the diameter of the outer surface of the shoulder 44 is greater than the diameter of the inner surface of the lip 46. Also, the collar 16 cannot be accidentally rotated, since the locking tabs 28 prevent rotation of the ends 54 and 56 away from and adjacent to the surfaces 40 until the collar 16 is lifted with respect to the ledge formations 22 and 24.

Disassembly of the device 10, when desired, can be readily accomplished. The collar 16 is sequentially raised, with respect to the ledge formations 22 and 24, rotated, about its longitudinal axis, until its ends 54 and 56 are adjacent to the surfaces 38, and then lowered so that the ends 54 and 56 pass through the slots 34 and 36. The collar 16 cannot be rotated beyond the position in which the ends 54 and 56 are in registry with the slots 32 and 34, and the ends 54 and 56 can be kept from abutting the locking tabs 28 by keeping the ends 54 and 56 in contact with the first guiding surface 38 when the collar 16 is being lowered.

From the foregoing, it should be apparent to those having skill in the art that modifications or changes could be made in the design of the device 10 described herein. Thus the preferred embodiment of the present invention is to be considered in all respects as illustrative and not restrictive, the scope of the invention claimed being measured by the appended claims, rather than the foregoing description.

What is claimed is:

1. An improved interlocking assembly for a device such as an air filter, an air lubricator, filter-regulator piggyback or the like, comprising:

a head member including a generally cylindrical outer wall, more than one uniformly radially outwardly projecting arcuate ledge formations integrally formed on said outer wall and more than one arcuate slots defined on said outer wall between said ledge formations, said ledge formation including an axially extending locking tab adjacent said slot and defining a transversely extending arcuate support surface adjacent said locking tab, said support surface being axially recessed from said locking tab and having an arcuate length substantially equal to the arcuate length of said slot;

a pressure vessel including a generally cylindrical open end section and a circumferential outwardly projecting shoulder integrally formed on said open end section;

a collar having an annular ring section, a circumferential radially inwardly projecting lip integrally formed on said ring section, and more than one circumferentially spaced, outwardly projecting, axially extending lug members, said lug member having an inwardly projecting end defining a transversely extending arcuate contact surface, said lug member having an arcuate length substantially equal to the arcuate length of said slot, said lip having an inner diameter less than the diameter of said shoulder, said ring portion having an inner diameter substantially equal to the diameter of said shoulder;

said pressure vessel and collar thereby cooperating so that said pressure vessel normally nests in said ring section with said shoulder abutting said lip, said head member and collar thereby cooperating so that said contact surface normally rests on said support surface, said collar being movable sequentially, axially in a first axial direction so that said ends extend axially past said locking tabs, rotatably so that said ends are in registry with said slots and axially in a direction opposite said first axial direction until said head member and collar separate, said locking tabs thus preventing said collar from being rotated unless said collar is moved in said first axial direction, whereby said pressure vessel is normally held against said head member by said collar, is readily removable and is prevented from being accidentally removed.

2. The improved interlocking assembly of claim 1 wherein said ledge formation has a wall portion defining a first guiding surface adjacent said slot for preventing said collar from being rotated past a position in registry with said slot whenever said collar is moved to separate from said head member.

3. The improved interlocking assembly of claim 1 wherein said ledge formation has a wall portion defining a second guiding surface adjacent said support surface for preventing said hook member from being rotated past a position in registry with said support surface whenever said hook member is rotated toward the normal position.

4. The improved interlocking assembly of claim 1 wherein said head member has two diametrically opposed ledge formations, and said collar has two diametrically opposed lug members.

5. The improved interlocking assembly of claim 1 wherein said head member has a longitudinally extending cylindrical seal surface defining a circumferential groove for an O-ring.

* * * * *